(No Model.)
C. HEINZERLING.
PROCESS OF GENERATING STEAM AND UTILIZING EXHAUST.
No. 311,984. Patented Feb. 10, 1885.
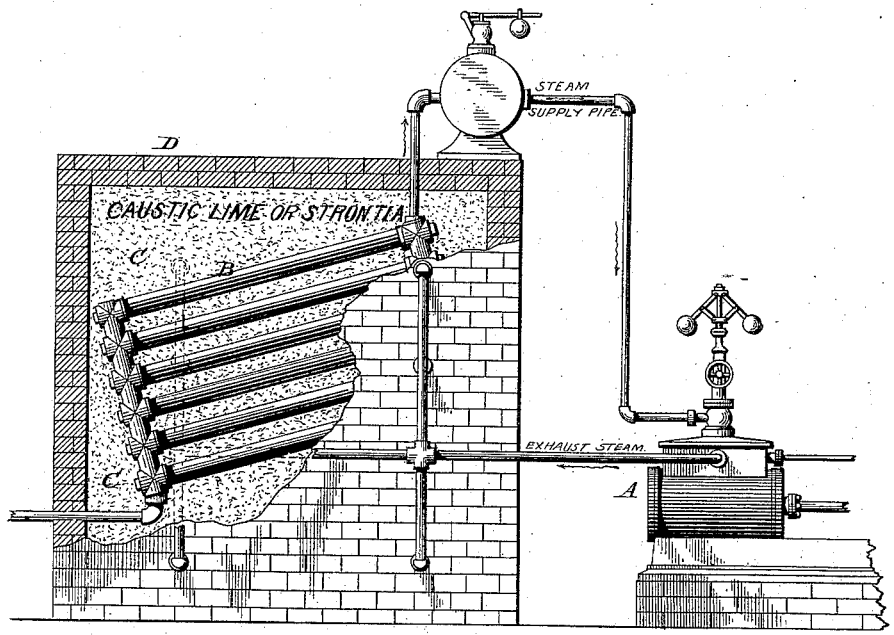

UNITED STATES PATENT OFFICE.

CHRISTIAN HEINZERLING, OF FRANKFORT-ON-THE-MAIN, GERMANY.

PROCESS OF GENERATING STEAM AND UTILIZING EXHAUST.

SPECIFICATION forming part of Letters Patent No. 311,984, dated February 10, 1885.

Application filed April 16, 1884. (No model.) Patented in Germany March 28, 1884; in England March 31, 1884, No. 5,699, and in France March 31, 1884, No. 161,293.

*To all whom it may concern:*

Be it known that I, CHRISTIAN HEINZERLING, of Frankfort-on-the-Main, in the Empire of Germany, doctor of philosophy, have invented certain new and useful Improvements in the Process of Generating Steam and Utilizing Exhaust, of which the following is a specification.

This invention relates to a novel method of generating live steam and utilizing exhaust; and it consists in delivering exhaust-steam into or upon quicklime or caustic strontia, closely surrounding or in contact with the vessel containing the water to be converted into steam.

The accompanying drawing illustrates one embodiment of my invention, the generator casing or chamber being broken away to show the interior.

I may state here that prior to my invention various plans have been devised or proposed for generating heat without actual combustion, and among other plans it has been proposed to permit water to flow upon quicklime or like substance placed beneath a retort or vessel containing carbonic-acid gas, ammonia, or other gaseous matters, in order to heat such gaseous matters and produce a sufficiently high tension or pressure thereof for the operation of motors. Such plan involves the use and care of special water-tanks, and the low temperature of the water in a measure neutralizes the heat of the moistened lime. Another proposed plan bears a stronger resemblance to mine, and consists in discharging exhaust-steam into or upon caustic soda or caustic potash, and thereby utilizing the exhaust and securing a considerable amount of heat. Caustic soda and caustic potash used in this manner do not, however, give as good results as quicklime or caustic strontia, and are vastly more dangerous to use. With quicklime or strontia the steam passes from its vaporous state to a solid by chemically combining therewith and forming a hydrate, whereas with the caustic soda and caustic potash steam unites only sufficiently to form a liquid, thus showing less absorption and a smaller generation of heat; therefore, while disclaiming both of the plans above set forth, I have discovered and embodied an improvement of great practical value.

In carrying out my invention I take calcium oxide (quicklime) or strontium oxide, either of which combines with water very readily, giving off a great heat and falling to a white powder, called "calcium hydrate," (slaked lime,) or, as the case may be, strontium hydrate. Each of these hydrates can be converted again into oxides by strong heat. Steam converts calcium and strontium oxides in the same way that water does into hydrates. A layer of granular lime can therefore serve as a means for absorbing steam completely. When steam is absorbed by calcium oxide, (quicklime,) heat is evolved in two ways: first. the whole latent heat of steam, five hundred and thirty-seven calories; second, the combining heat of calcium oxide with water, one hundred and forty-four calories. This heat produced by the absorption of steam and combination of calcium oxide with water can be raised to about 250° or 300° Celsius.

The accompanying drawing illustrates the manner of carrying out my process as applied to steam-engines. The steam-engine A can be of any ordinary construction. The steam-generator chamber B, which is preferably tubulous, is first filled with water, and steam heated, say, to sixty pounds on the square inch (four atmospheres) from any convenient boiler. Surrounding the steam-generator B, I place a filling, C, of quicklime ($Ca^2O$) or caustic strontia, ($Sr^2O$,) preferably lime, as having the smallest combining equivalent, and being capable of giving out the largest amount of heat per pound weight of material, besides being the cheapest. When the steam-engine A is set in action, the exhaust-steam is let into the quicklime-chamber D. This unites with the quicklime, forming hydrate of lime, and gives out heat, as above described, penetrating through the walls of the steam-generator B, and causing the generation of more steam for the engine. This action, consequently, goes on until the water and steam in the generator B become exhausted, or the quicklime becomes fully hydrated and its temperature and that of the water falls too low to generate the steam requisite to work the engine. If, too, the quicklime-chamber be air-tight and an air-pump be used, the condensation of the steam will form a vacuum which will still further increase the power of the engine, as in ordinary condensing-engines.

The actual form of mechanism I propose to adopt for steam-engine purposes I intend to cover under another patent upon an application filed by me on the 3d day of April, 1884, Serial No. 126,564.

Having thus described my invention, what I claim is—

The herein-described method of generating steam and utilizing exhaust, which consists in discharging exhaust-steam into or upon quicklime or caustic strontia in intimate contact with the steam-generator.

In testimony whereof I have signed my name to this specification in the presence of two subscribing witnesses.

CHRISTIAN HEINZERLING.

Witnesses:
    MORITZ WEINIG,
    A. S. HOGUE.